(12) United States Patent
Kutliroff et al.

(10) Patent No.: US 8,958,631 B2
(45) Date of Patent: Feb. 17, 2015

(54) SYSTEM AND METHOD FOR AUTOMATICALLY DEFINING AND IDENTIFYING A GESTURE

(75) Inventors: Gershom Kutliroff, Alon Shrut (IL); Itamar Ben-Ari, Tel Aviv (IL); Amit Bleiweiss, Yad Binyamin (IL); Dagan Eshar, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 300 days.

(21) Appl. No.: 13/310,510

(22) Filed: Dec. 2, 2011

(65) Prior Publication Data
US 2013/0142417 A1    Jun. 6, 2013

(51) Int. Cl.
*G06K 9/62* (2006.01)

(52) U.S. Cl.
USPC ........................................ 382/159

(58) Field of Classification Search
None
See application file for complete search history.

(56) References Cited

U.S. PATENT DOCUMENTS

| | | | |
|---|---|---|---|
| 4,900,033 A | 2/1990 | Campos et al. | |
| 5,534,917 A | 7/1996 | MacDougall | |
| 6,072,494 A | 6/2000 | Nguyen | |
| 6,181,343 B1 | 1/2001 | Lyons | |
| 6,256,033 B1 | 7/2001 | Nguyen | |
| 6,270,414 B2 | 8/2001 | Roelofs | |
| 6,336,891 B1 | 1/2002 | Fedrigon et al. | |
| 6,632,158 B1 | 10/2003 | Nashner | |
| 6,788,809 B1 | 9/2004 | Grzeszczuk et al. | |
| 6,941,239 B2 | 9/2005 | Unuma et al. | |
| 7,038,855 B2 | 5/2006 | French et al. | |
| 7,340,077 B2 | 3/2008 | Gokturk et al. | |
| 7,369,685 B2 | 5/2008 | DeLean | |
| 7,372,977 B2 | 5/2008 | Fujimura et al. | |
| 7,379,563 B2 | 5/2008 | Shamaie | |
| 7,421,369 B2 | 9/2008 | Clarkson | |
| 7,725,547 B2 | 5/2010 | Albertson et al. | |
| 7,734,097 B1 * | 6/2010 | Porikli et al. | 382/190 |
| 7,753,861 B1 | 7/2010 | Kahn et al. | |
| 7,781,666 B2 | 8/2010 | Nishitani et al. | |
| 7,789,800 B1 | 9/2010 | Watterson et al. | |

(Continued)

FOREIGN PATENT DOCUMENTS

| | | |
|---|---|---|
| JP | 2007316882 A | 12/2007 |
| KR | 1020060070280 | 12/2007 |
| WO | WO-9919788 A1 | 4/1999 |
| WO | WO-2005114556 A2 | 12/2005 |
| WO | WO-2011036618 A2 | 3/2011 |

OTHER PUBLICATIONS

Alon, J., et al., "Accurate and Efficient Gesture Spotting via Pruning and Subgesture Reasoning", Computer Vision in Human-Computer Interaction Lecture Notes in Computer Science, LNCS, Springer, Berlin, DE, pp. 189-198, Jan. 1, 2005.

(Continued)

*Primary Examiner* — Brian P Werner
(74) *Attorney, Agent, or Firm* — Blakely, Sokoloff, Taylor & Zafman LLP

(57) ABSTRACT

A system and method for creating a gesture and generating a classifier that can identify the gesture for use with an application is described. The designer constructs a training set of data containing positive and negative examples of the gesture. Machine learning algorithms are used to compute the optimal classification of the training data into positive and negative instances of the gesture. The machine learning algorithms generate a classifier which, given input data, makes a decision on whether the gesture was performed in the input data or not.

30 Claims, 6 Drawing Sheets

(56) References Cited

U.S. PATENT DOCUMENTS

| | | | |
|---|---|---|---|
| 7,840,031 B2 | 11/2010 | Albertson et al. | |
| 7,843,425 B2 | 11/2010 | Lu et al. | |
| 7,970,176 B2 | 6/2011 | Kutliroff et al. | |
| 7,971,156 B2 | 6/2011 | Albertson et al. | |
| 8,094,928 B2 | 1/2012 | Graepel et al. | |
| 8,113,991 B2 | 2/2012 | Kutliroff | |
| 2001/0016510 A1 | 8/2001 | Ishikawa et al. | |
| 2003/0078138 A1 | 4/2003 | Toyama | |
| 2003/0134714 A1 | 7/2003 | Oishi et al. | |
| 2003/0156756 A1 | 8/2003 | Gokturk et al. | |
| 2004/0001113 A1 | 1/2004 | Zipperer et al. | |
| 2005/0227811 A1 | 10/2005 | Shum et al. | |
| 2005/0271279 A1 | 12/2005 | Fujimura et al. | |
| 2006/0018516 A1 | 1/2006 | Masoud et al. | |
| 2006/0202953 A1 | 9/2006 | Pryor et al. | |
| 2007/0110298 A1 | 5/2007 | Graepel et al. | |
| 2007/0298883 A1 | 12/2007 | Feldman et al. | |
| 2008/0063263 A1* | 3/2008 | Zhang et al. | 382/159 |
| 2008/0139307 A1 | 6/2008 | Ueshima et al. | |
| 2008/0152191 A1 | 6/2008 | Fujimura et al. | |
| 2008/0192005 A1 | 8/2008 | Elgoyhen et al. | |
| 2008/0225041 A1 | 9/2008 | El Dokor et al. | |
| 2008/0244465 A1 | 10/2008 | Kongqiao et al. | |
| 2008/0258921 A1 | 10/2008 | Woo et al. | |
| 2009/0023555 A1 | 1/2009 | Raymond | |
| 2009/0048070 A1 | 2/2009 | Vincent et al. | |
| 2009/0085864 A1 | 4/2009 | Kutliroff et al. | |
| 2009/0113389 A1 | 4/2009 | Ergo et al. | |
| 2009/0175540 A1 | 7/2009 | Dariush et al. | |
| 2009/0232353 A1 | 9/2009 | Sundaresan et al. | |
| 2009/0234614 A1 | 9/2009 | Kahn et al. | |
| 2009/0262986 A1 | 10/2009 | Cartey et al. | |
| 2009/0298650 A1 | 12/2009 | Kutliroff | |
| 2010/0034457 A1 | 2/2010 | Berliner et al. | |
| 2010/0066676 A1 | 3/2010 | Kramer et al. | |
| 2010/0103093 A1 | 4/2010 | Izumi | |
| 2010/0111370 A1 | 5/2010 | Black et al. | |
| 2010/0208038 A1* | 8/2010 | Kutliroff et al. | 348/46 |
| 2010/0306699 A1 | 12/2010 | Hsu et al. | |
| 2011/0081073 A1* | 4/2011 | Skipper et al. | 382/159 |
| 2011/0090407 A1 | 4/2011 | Friedman | |
| 2011/0249107 A1 | 10/2011 | Chiu | |
| 2012/0306745 A1* | 12/2012 | Moore et al. | 345/158 |
| 2013/0076615 A1* | 3/2013 | Iao | 345/156 |
| 2013/0077820 A1* | 3/2013 | Marais et al. | 382/103 |

OTHER PUBLICATIONS

Fujiki R., Arita D., and Taniguchi, R.: Real-time 3D hand shape estimation based on inverse kinematics and physical constraints. Proc ICIAP Springer LNCS 2005, Fabio Rolio and Sergio Vitulano (Eds.). 3617:850-858, 2005.

Hansen, D., et al., "In the Eye of the Beholder: A Survey of Models for Eyes and Gaze," IEEE Transactions on Pattern Analysis and Machine Intelligence, vol. 32, Issue 3, pp. 478-500, Mar. 2010.

Keskin, C., et al., Real Time Hand Tracking and 3D Gesture Recognition for Interactive Interfaces Using HMM, Computer Engineering Dept. Bogazici University, pp. 1-4, 2003.

Lewis, J.P., et al., "Pose space deformations: A unified approach to shape interpolation and skeleton-driven deformation", Annual Conference Series, ACM SIGGRAPH, pp. 165-172, 2000.

Mackie, J., et al., "Finger Detection with Decision Trees, 2004. Proceedings of Image and Vision Computing New Zealand", pp. 399-403, 2004.

Oikonomidis, I., et al., "Efficient Model-Based 3D Tracking of Hand Articulations using Kinect", 22nd British Machine Vision Conference, pp. 1-11, Aug. 29-Sep. 2, 2011.

Pavlovic, V.I., et al., Visual Interpretation of Hand Gestures for Human-Computer Interaction: A Review, Department of Electrical and Computer Engineering, and The Beckman Institute for Advanced Science and Technology University of Illinois at Urbana-Champaign, 36 pages, Jul. 1997.

Portillo-Rodriguez, O., et al., "Development of a 3D real time gesture recognition methodology for virtual environment control", Robot and Human Interactive Communication, 2008 Ro-Man 2008, The 17th IEEE International Symposium on, IEEE, Piscataway, N.J., U.S.A, pp. 279-284, Aug. 1, 2008.

Segen, J., et al., Fast and Accurate 3D Gesture Recognition Interface, AT&T Bell Laboratories, Holmdel, NJ 07733, pp. 86-91, Aug. 16-20, 1997.

Zhu, Y., et al., "Controlled Human Pose Estimation from Dept H Image Streams" IEEE Computer Society Conference on Computer Vision and Pattern Recognition Workshops (CVPRW 08), pp. 1-8, see Abstract: Sections 2,3, and 5: figure 1, Jun. 23-28, 2008.

International Search Report and Written Opinion mailed Sep. 16, 2010, for International Application No. PCT/US2010/023179, filed Feb. 4, 2010, 7 pages.

International Search Report and Written Opinion mailed Feb. 28, 2013, for International Application No. PCT/US2012/047364, filed Jul. 19, 2012, 11 pages.

Extended Search Report with Supplementary Search Report and Search Opinion Mailed Jun. 18, 2013, for European Patent Application No. EP 10744130 filed Feb. 4, 2010.

Co-pending U.S. Appl. No. 11/866,280 by Kutliroff, G., et al., filed Oct. 2, 2007.

Co-pending U.S. Appl. No. 12/392,879 by Kutliroff, G., filed Feb. 25, 2009.

Co-pending U.S. Appl. No. 12/707,340 by Kutliroff, G., et al., filed Feb. 17, 2010.

Co-pending U.S. Appl. No. 12/817,102 by Kutliroff, G., et al., filed Jun. 16, 2010.

Co-pending U.S. Appl. No. 13/441,271 by Bleiweiss, A., et al., filed Apr. 6, 2012.

Co-pending U.S. Appl. No. 13/532,609 by Kutliroff, G., et al., filed Jun. 25, 2012.

Co-pending U.S. Appl. No. 13/552,978 by Yanai, Y., filed Jul. 19, 2012.

Co-pending U.S. Appl. No. 13/563,516 by Kutliroff, G., et al., filed Jul. 31, 2012.

Co-pending U.S. Appl. No. 13/652,181 by Yanai, Y., et al., filed Oct. 15, 2012.

Co-pending U.S. Appl. No. 13/676,017 by Kutliroff, G., et al., filed Nov. 13, 2012.

Co-pending U.S. Appl. No. 13/768,835 Fleischmann, S., et al., filed Feb. 15, 2013.

Co-pending U.S. Appl. No. 13/785,669 by Kutliroff, G., et al., filed Mar. 5, 2013.

Co-pending U.S. Appl. No. 13/857,009 Fleischmann, S., et al., filed Apr. 4, 2013.

Notice of Allowance Mailed Mar. 15, 2011, in Co-Pending U.S. Appl. No. 11/866,280 by Kutliroff, G., et al., filed Oct. 2, 2007.

Restriction Requirement Mailed Aug. 31, 2010, in Co-pending U.S. Appl. No. 12/392,879 by Kutliroff, G., filed Feb. 25, 2009.

Non-Final Office Action Mailed Dec. 22, 2010, in Co-pending U.S. Appl. No. 12/392,879 by Kutliroff, G., filed Feb. 25, 2009.

Final Office Action Mailed Jun. 10, 2011, in Co-pending U.S. Appl. No. 12/392,879 by Kutliroff, G., filed Feb. 25, 2009.

Notice of Allowance Mailed Oct. 21, 2011, in Co-pending U.S. Appl. No. 12/392,879 by Kutliroff, G., filed Feb. 25, 2009.

Non-Final Office Action Mailed Mar. 23, 2012, in Co-pending U.S. Appl. No. 12/707,340 by Kutliroff, G., et al., filed Feb. 17, 2010.

Final Office Action Mailed Sep. 14, 2012, in Co-pending U.S. Appl. No. 12/707,340 by Kutliroff, G., et al., filed Feb. 17, 2010.

Restriction Requirement Mailed Nov. 30, 2012, in Co-pending U.S. Appl. No. 12/817,102 by Kutliroff, G., et al., filed Jun. 16, 2010.

Non-Final Office Action Mailed Jan. 29, 2013, in Co-pending U.S. Appl. No. 12/817,102 by Kutliroff, G., et al., filed Jun. 16, 2010.

Notice of Allowance mailed Jul. 29, 2013, in Co-pending U.S. Appl. No. 12/817,102 by Kutliroff, G., et al., filed Jun. 16, 2010.

* cited by examiner

SYSTEM AND METHOD FOR AUTOMATICALLY DEFINING AND IDENTIFYING A GESTURE

CROSS-REFERENCES TO RELATED APPLICATIONS

This application is related to U.S. Pat. No. 7,970,176, entitled "METHOD AND SYSTEM FOR GESTURE CLASSIFICATION", filed Oct. 2, 2007 and issued Jun. 28, 2011; U.S. patent application Ser. No. 12/707,340, entitled "METHOD AND SYSTEM FOR GESTURE RECOGNITION", filed Feb. 17, 2010; and U.S. patent application Ser. No. 12/817,102, entitled "METHOD AND SYSTEM FOR MODELING SUBJECTS FROM A DEPTH MAP", filed Jun. 16, 2010, all of which are incorporated by reference herein in their entireties.

BACKGROUND

The devices and electronic gadgets with which people interact are becoming more intelligent and capable of supporting an increasingly diverse array of functions, while also becoming more and more integrated into people's daily lives. The ways in which people interact with these devices and access their varied functionality is also changing dramatically. The familiar keyboard and mouse, while effective tools for inputting text and choosing icons on the virtual desktop, are very ineffective at manipulating objects in a virtual three dimensional space. Many devices, such as mobile phones, personal digital assistants (PDAs) and handheld consoles, do not have room for a full keyboard.

Ideally, people would communicate with their electronic devices and computers directly through their own physical movements. In fact, significant advances have been made in recent years in the application of gesture control for user interaction with electronic devices. Gestures can be used to control a television, for home automation (i.e., to turn on/off appliances and lights), as interfaces for tablets, personal computers, and mobile phones. As core technologies continue to improve and their costs decline, gesture control is destined to continue to play a major role in the way in which people interact with electronic devices.

SUMMARY

In the present disclosure, a gesture designer first constructs a training set of data that contains both positive and negative examples of a gesture to be detected. The designer then marks the positive examples and has the option of marking the negative examples as well. Subsequently, machine learning algorithms are used to compute the optimal classification of the training data into positive and negative instances of the gesture. The machine learning algorithms generate a classifier which, given input data, makes a decision on whether the gesture was performed in the input data or not. The designer tests the classifier on pre-recorded movement sequences to measure its performance. If the definition of the gesture needs to be improved, more positive and/or negative examples can be added to the training data. Once the classifier is performing sufficiently well, the classifier is tested live on people making gestures, and the refinement process is repeated, until the gesture designer is satisfied with the performance of the classifier in recognizing a particular gesture.

The present disclosure is applicable to a designer designing a game or other application that allows a user to interact with an electronic device through gesture control, such as a device for home automation. It is also applicable to the end user who can design and create his own gestures for use with a gesture recognition system. For example, a user can define a thumb's up gesture to raise the volume of the music on his laptop.

U.S. Pat. No. 7,970,176, entitled "METHOD AND SYSTEM FOR GESTURE CLASSIFICATION", describes a method and system for using gesture recognition to drive gameplay in games and is incorporated by referenced in its entirety. Such a method and system may be utilized by the present disclosure, as described below. In one embodiment, the method described in U.S. Pat. No. 7,970,176, is applicable to data generated from the IK Solver model.

U.S. patent application Ser. No. 12/707,340, entitled "METHOD AND SYSTEM FOR GESTURE RECOGNITION", describes a method for gesture recognition and is hereby incorporated here in its entirety.

BRIEF DESCRIPTION OF THE DRAWINGS

Examples of a system for automatically defining and identifying gestures are illustrated in the figures. The examples and figures are illustrative rather than limiting.

DETAILED DESCRIPTION

Figure 1:
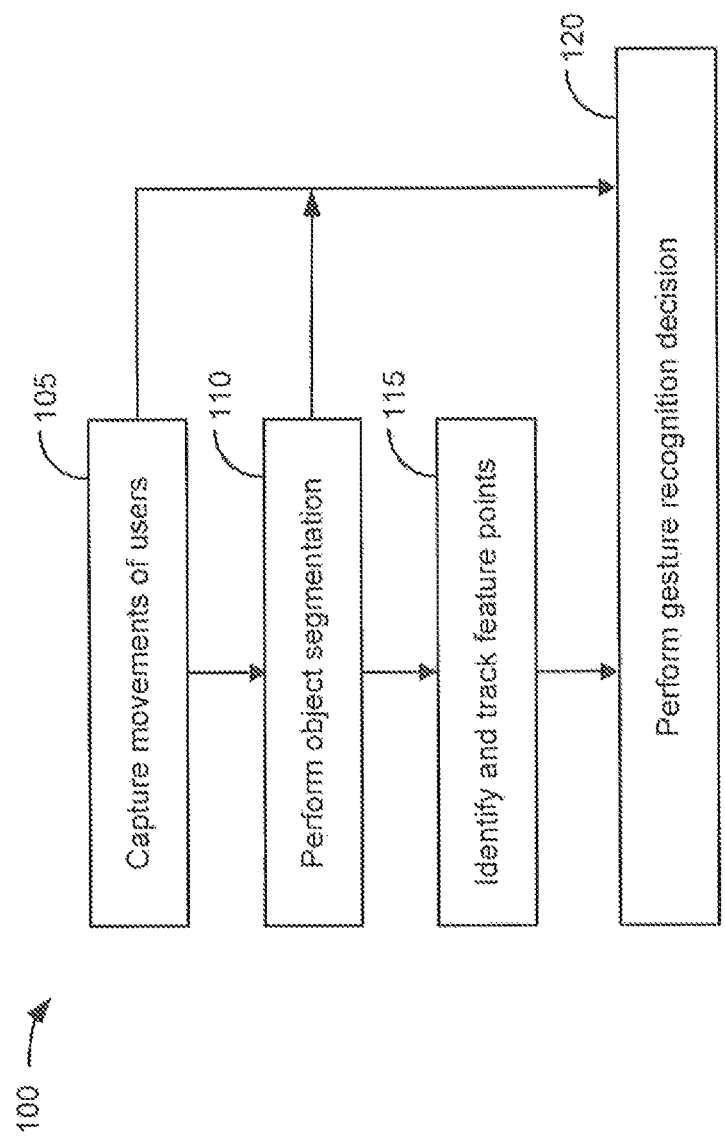
FIG. 1 is a flow diagram illustrating an example process of manipulating input data within a gesture recognition framework.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Interacting with an electronic device through gesture control requires the device to be able to recognize the gesture(s) that a user is making. For the purposes of this disclosure, the term 'gesture recognition' is used to refer to a method for identifying specific movements or pose configurations performed by a user. For example, gesture recognition can refer to a swipe on a mousepad in a particular direction having a particular speed, a finger tracing a specific shape on a touchscreen, or the wave of a hand. The device must decide whether a particular gesture was performed or not by analyzing data describing the user's interaction with a particular hardware/software interface. That is, there must be some way of detecting or tracking the object that is being used to perform or execute the gesture. In the case of a touchscreen, it is the combination of the hardware and software technologies necessary to detect the user's touch on the screen. In the case of a depth sensor-based system, it is generally the hardware and software combination necessary to identify and track the user's joints and body parts.

In these examples of device interaction through gesture control, a tracking layer enables gesture recognition. Gesture recognition is distinct from the process of tracking. As an example, if the user moves his hand and the mouse cursor follows his hand and is mapped to the screen, this type of interaction does not involve any gesture recognition, per se. On the other hand, if the user waves his hand in front of the screen in order to interact with a particular application, his wave motion can be recognized as a "wave" gesture. Typically, the recognition of a gesture triggers a pre-defined behavior (e.g., a wave with the hand turns off the lights) in the application, device, or game that the user is interacting with.

The input to a gesture recognition system can be data describing a user's movements that originates from any number of different input devices, such as touchscreens (single-touch or multi-touch), movements of the player as captured with an RGB camera, and movements of the player as captured using a depth sensor. The Nintendo Wii console gaming system is an example of a gesture recognition system in which the player's movements are detected by accelerometers, and the position of the controller is calculated via triangulation and then processed to detect gestures performed (such as running, for example). The Nintendo Wii balance board is another such example of a gesture recognition system in which the user's weight on different scales is used as the data input to the gesture recognition.

U.S. patent application Ser. No. 12/817,102, entitled "METHOD AND SYSTEM FOR MODELING SUBJECTS FROM A DEPTH MAP", filed Jun. 16, 2010, describes a method of tracking a player using a depth sensor and identifying and tracking the joints of his body. It is hereby incorporated in its entirety in the present disclosure.

There are many examples of gestures and their uses for interacting with an application or device. For example, pinching the thumb and forefinger together indicates a grabbing action that can be used to select an icon on a computer screen that represents a particular application. Another example of a gesture is a player jumping up or jumping to the side while playing an interactive game, and raising the hand and rotating it can be a gesture indicating that the user would like the lights in a room to go on or off.

Robust gesture recognition can be quite difficult to implement. In particular, it can be difficult to interpret the user's intentions accurately, e.g., when a gesture begins and when a gesture ends. Moreover, different users will likely perform the same gesture in slightly different ways, thus further complicating the design and implementation of a gesture recognition scheme. In addition, it is typically desirable from a design perspective to condition the recognition of a set of gestures on the context in which the gestures are active. If a game designer is designing a boxing game in which the player's physical moves trigger punches from a virtual opponent in the game, the designer may want to allow the player to throw different types of punches. Then the gesture recognition system will have to be capable of reliably differentiating between the different punches. In this case, the definition of the different types of punches will likely be narrow, for example, a jab punch should only be thrown directly in front of the user, while a hook punch involves lateral movement, starting from the side of the player and moving across his body. On the other hand, perhaps the game designer will elect that all of the player's punches yield the same punch action on the virtual character. In this case, the designer is not interested in differentiating between, say, a jab punch and a hook punch.

Once the designer defines the particular gestures to be used, it is, in general, difficult to implement a gesture recognition system that can robustly identify the designer's gestures. Traditionally, software or pseudo-code is written that places conditions on the tracking data in order to recognize a user's gestures. For example, a punch gesture might depend on the three-dimensional positions of the right hand over successive frames of tracking data. However, this approach can be very difficult to implement. Due to variances in the way different people perform the same gesture and the need to continuously revise the gesture recognition algorithms, explicitly writing software to perform gesture recognition of specific gestures can become a tedious and costly process.

The present disclosure describes an alternative way to create gestures relatively quickly in a manner that is far less involved than explicitly defining pseudo-code. Additionally, the disclosure provides a method of creating gestures that does not require writing any software code.

TERMINOLOGY

Gesture Recognition System. A gesture recognition system is a system that recognizes and identifies pre-determined movements performed by a user in his interaction with some input device. Examples include interpreting data from a camera to recognize that a user has closed his hand, or interpreting the data to recognize a forward punch with the left hand.

Depth Sensors. The present disclosure may be used for gesture recognition of data acquired from depth sensors, which are sensors that generate three-dimensional data. There are several different types of depth sensors, such as sensors that rely on the time-of-flight principle, structured light, or speckled pattern technology, and stereoscopic cameras. These sensors may generate an image with a fixed resolution of pixels, where each pixel has an integer value, and the values correspond to the distance of the object projected onto that region of the image by the sensor. In addition to this depth data, the depth sensors may also generate color data in the same way that conventional color cameras do, and the color data can be combined with the depth data for use in processing.

Gesture. A gesture is a unique, clearly distinctive motion or pose of one or more body joints.

Gesture Designer. The person responsible for defining the gestures, their context (i.e., which other gestures are active at the same time), and creating the model for identifying the gestures, according to the present disclosure.

Positive Examples. Data corresponding to the correct performance of a gesture.

Negative Examples. Data corresponding to something other than the correct performance of a gesture.

Classifier. A process that identifies a given motion as a target gesture, or rejects the motion if it is not the target gesture.

Input Data. The tracking data used as input into the gesture recognition layer. This data is generated by the actual movements of the user.

Moving Gesture. A gesture corresponding to the motion of the subject, performed during an interval of time, such as a "running" gesture.

Pose Gesture. A gesture that occurs at a fixed time. For example, the right hand extended.

The process of gesture recognition analyzes input data to decide whether a gesture was performed or not. FIG. 1 is a flow diagram illustrating an example process of manipulating input data within a gesture recognition framework. At block 105, the movements of a user are captured by an input device, such as a depth sensor. Data obtained from the depth sensor can be used directly by the system for gesture recognition at block 120. Alternatively, at block 110, object segmentation can be performed on the depth image data to identify objects of interest. Masks corresponding to these objects or other information from the object segmentation can be used for gesture recognition at block 120.

In one embodiment, after object segmentation, at block 115 features points in the image data are identified and tracked. A tracking module is used to process the image data from the depth sensor by identifying and tracking the feature points of the user, such as skeleton joints. In the case where the user is standing far enough from the depth sensor so that a large part of his body is in the camera's field-of-view, the joints detected may be the joints of the shoulders, elbows and hands. Alternatively, the user may be in close proximity to the depth sensor, so that the joints detected are the joints of the hands and fingers. In one embodiment, other features can be used, such as the silhouette of the user, the number of pixels in the depth mask, etc. In this case, block 115 and the tracking module are not needed.

At block 120, the gesture recognition decision is performed based on the input data. In one embodiment, a classifier is used at block 120 to determine whether a gesture was performed or not, and the decision is based on the skeleton joints tracking data generated at block 115.

Figure 2:
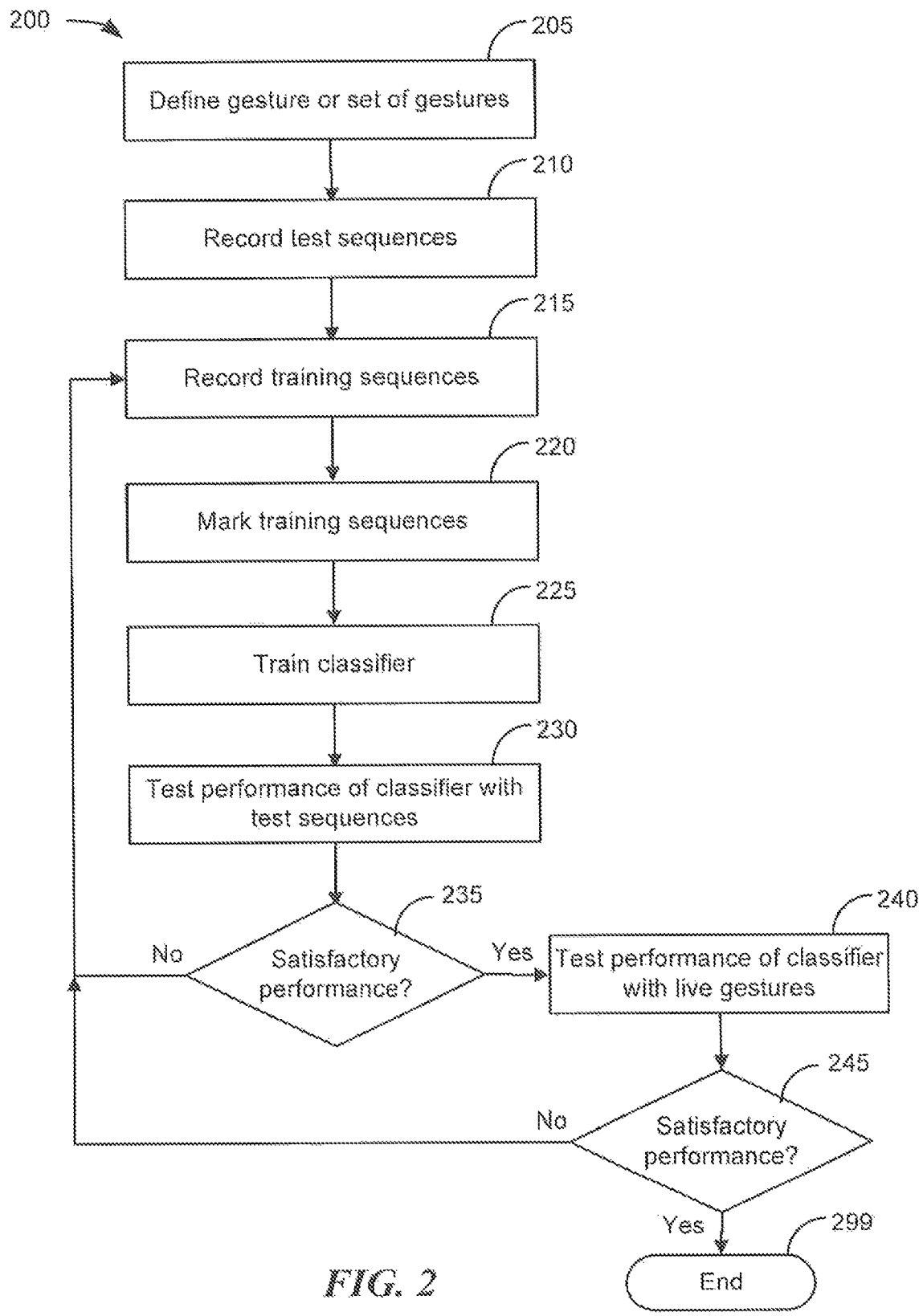
FIG. 2 is a flow diagram illustrating an example process of creating a gesture and generating a classifier that can identify the gesture for use with an application.

FIG. 2 is a flow diagram illustrating an example process of creating a gesture and generating a classifier that can identify the gesture for use with an application. At block 205, the designer defines a gesture or set of gestures. At this stage, the designer defines the pose or motion of the gesture. For example, the gesture may be a punch forward with the right hand, or it may be a pose such as stretching the right hand straight to the side.

The designer should carefully consider the context of the gesture within the game or application that is being built. In particular, the designer should consider which other gestures may be active while the player will be performing the gesture being designed. Often, the designer may want to define several gestures that will be active at the same time. For example, the designer may wish to define several different "punch" gestures, such as a side hook and an uppercut, in addition to a front punch forward. In the case where the designer is designing a set of gestures that are all active at the same time, each gesture is defined through its own characterization, as well as the characterization of the other gestures in the set—e.g., the front forward punch should only be detected when the motion of the player's hand is straight away from the body, but not when there is a sideways, lateral, component to the motion, since that constitutes a hook punch.

At block 210, after the gesture, or set of gestures, has been defined, the designer records test sequences of a person, or preferably several people, performing both positive as well as negative examples of the gesture(s). A positive example is the correct performance of the gesture or a performance of the gesture that varies within acceptable limits, while a negative example is the performance of some other motion or pose or the performance of the gesture that varies beyond acceptable limits. These test sequences will be stored and used to test the performance of a classifier in identifying the gesture or set of gestures that the designer creates. Importantly, they are not used in the training process to prevent biasing the results of the testing.

At block 215, the designer records a set of training sequences. The training sequences should also contain both positive and negative examples of the gesture(s) to be created. These sequences will constitute the training data upon which the classifier will be trained to identify the gesture or gestures. Since the particular motion that characterizes a gesture is defined by what it is not, as well as by what it is, it is important to include a diverse group of negative examples to attain optimal performance of the classifier. Similarly, if the designer's goal is to create a gesture or set of gestures that can be identified when performed by a large group of people, it is important to record a sufficiently large and representative set of people performing the gestures because people generally perform the same gesture differently. The sequences recorded by the designer are stored by the gesture recognition system.

At block 220, the training sequences are marked by the designer. The parts of the sequences corresponding to a subject's performance of the gesture are marked as positive examples. By default, all other parts of the sequence serve as negative examples. The designer also has the option to explicitly mark negative examples in the training sequences, perhaps corresponding to the user moving in a way which is similar to a gesture being created, but not exactly the gesture.

Figure 4:
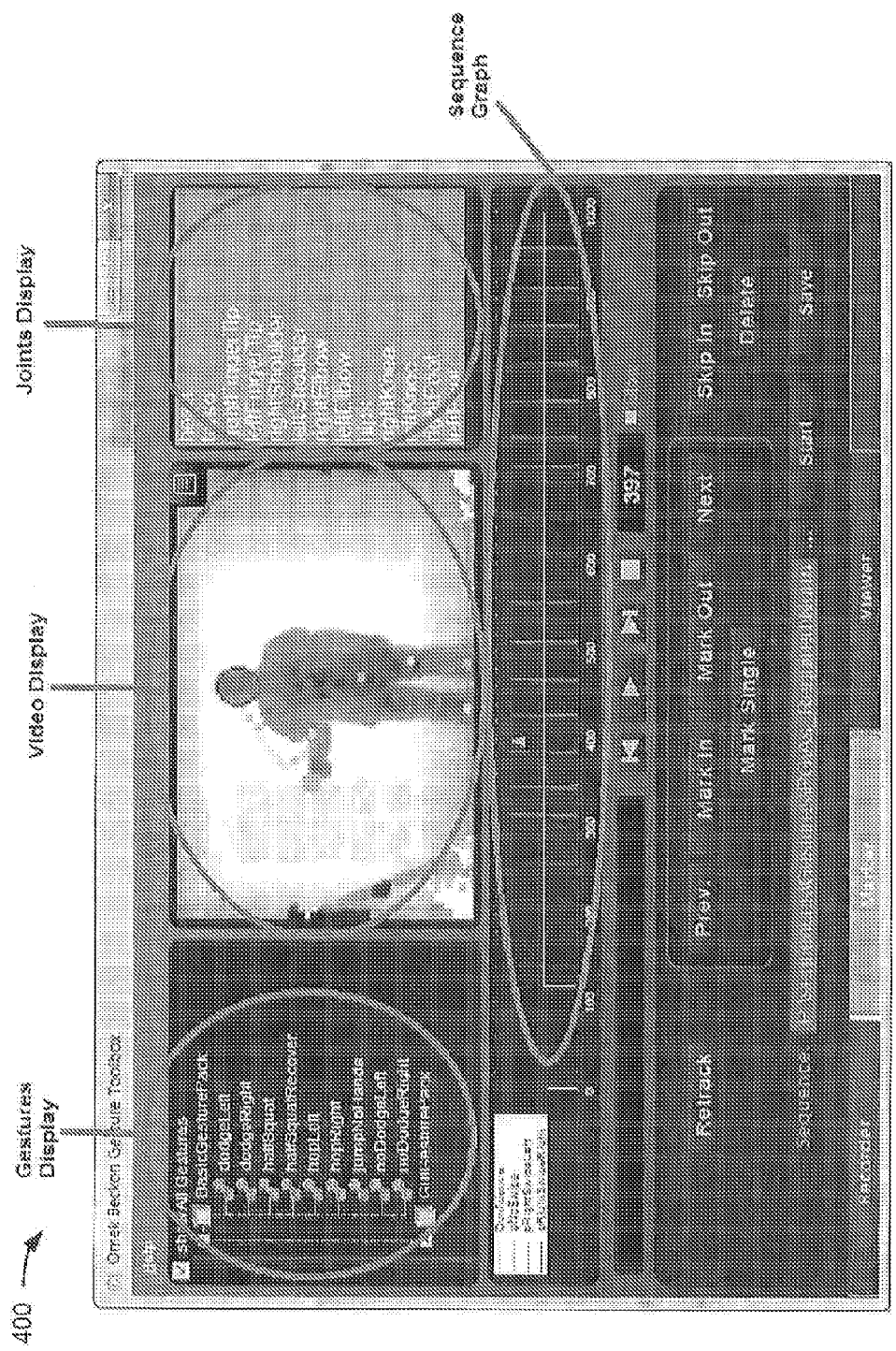
FIG. 4 shows an example screenshot of a sample user interface used for marking the locations in a sequence in which the user performed a particular gesture.

Block 225 is the learning phase of the gesture creation process where the designer trains machine learning algorithms used by the gesture recognition system to identify the gesture(s). The algorithms may carefully balance the number of positive examples with the number of negative examples. So explicitly marking a negative example can direct the machine learning algorithms to include the particular negative example in the negative examples training set, where the example may not be included by default. FIG. 4 shows an example screenshot of a sample user interface used for marking the locations of feature points of a subject in a sequence where a particular gesture occurred.

A gesture can be either a moving gesture or a pose gesture. If the gesture is a moving gesture, the range of frames of a sequence during which the subject performed the gesture is marked. For example, in the case of a punch gesture, these frames may represent the beginning of the motion of the hand forward, the full extension of the hand, and possibly even the retraction of the hand following the punch. If the gesture is a pose gesture, every frame in which the subject is performing the pose is marked (and possibly only single frames).

Other methods of indicating where the gesture is performed in the sequences can be implemented besides marking the sequences manually at each occurrence of a gesture. In one embodiment, voice recognition technology can be used to recognize when the user says the name of the gesture that is being performed, and the sequence being recorded is automatically marked, as per the user's direction. In another embodiment, the user can use a remote control device and indicate the beginning and/or end of a gesture by clicking the remote control. In another embodiment, the user is prompted by a computer program to perform the gesture at a specific time. For example, a countdown is shown on a display or provided verbally (e.g., "3, 2, 1, now") that notifies the user when to perform the gesture. A sequence is recorded during this time, and the meta-data describing when the gesture begins and/or ends is stored by the system.

As described in FIG. 1, there are different sets of data that can be used for gesture recognition. Once the training sequences have been marked, the data from these sequences constitute a repository of examples, both positive and negative, that effectively describe the gesture or gestures that the designer would like to create. Next, a classifier should be defined that can determine, for new data generated by the movements of a user that was not included in the training data, whether the new data is similar to the positive examples (and thus, should be classified as the gesture), or not. The classifier model is generated as an output at block 225 that can be used to determine whether a new set of movements of the user represents a gesture or not. In one embodiment, the classifier model is constructed using machine learning techniques that determine an optimal classification of the training data from the marked sequences as a positive gesture, or not. There are various types of machine learning algorithms that can be used in this classification. Some examples are Support Vector Machines (SVM), Hidden Markov Models (HMM), and neural networks.

Different types of classifiers can be generated, depending on the requirements of the design. In some cases, the classifier should simply decide whether a particular gesture was performed or not. In other cases, the classifier must decide whether one of several different gestures was performed, or none of the gestures was performed. In the former case, the classifier is trained to decide between whether a gesture was performed, or not. In the latter case, the classifier is trained to choose from among k+1 classes, in which there are k gestures and one other case corresponding to no gesture being performed at all.

As shown in FIG. 1 and discussed above, the input data to the machine learning algorithms used at block 225 can be either raw image data, object segmentation data (i.e., the "blob" corresponding to only the object of interest in the image), or tracking data corresponding to the subject's skeleton, or other features. The tracking data can correspond to all of the user's joints or feature points as generated by the tracking module, or only a subset of them. In addition, the input to block 225 can be any combination of these features, or any other features. Furthermore, machine learning algorithms typically generate different results (i.e., different classifiers) based on the number of positive examples and negative examples used in the training, as well as the relative proportions of these examples. In one embodiment, several different classifiers are trained on the training data, using different subsets of the positive and negative examples and different feature sets (such as object segmentation data or subsets of the tracking joints), and the classifier yielding the best performance on the training set (the most true positives and the least false positives) is selected.

In another embodiment, multiple classifiers can be generated from a set of training sequences, and then the best classifier can be selected automatically, such as by using the method of cross validation. This method removes the bias introduced by testing a classifier on data that was used to train the classifier by sequentially removing some of the training data, constructing a classifier based on the remaining data, and then testing the results of the classifier on the data that was removed from the training set. This is done repeatedly, cycling through the training data set, and then the best-performing classifier is selected.

At block 230, the best-performing classifier is tested on the test sequences, which are distinct from the training data sequences. At decision block 235, the designer determines if the performance of the classifier on the test sequences is satisfactory, where criteria for satisfactory performance can include a maximum number of false negatives and false positives. If the performance of the classifier is not satisfactory when tested on the test sequences (block 235—No), the designer returns to block 215, to add more data to the training data set. A decision on whether the performance of the classifier is satisfactory can be based upon the percentage of false positives and/or false negatives. The new training data should attempt to resolve the types of problems that were observed in the testing of the classifier on the testing sequences. For example, positive examples can be provided that are similar to the gestures that the classifier failed to identify as the target gesture(s), and negative examples can be provided that the classifier identified as the target gesture(s) but were not actually the target gesture(s).

If the performance of the classifier on the test sequences is satisfactory (block 235—Yes), at block 240 the designer tests the classifier on live gestures, not test sequences. At decision block 245, the designer determines if the performance of the classifier on the live gestures is satisfactory. If the performance of the classifier on live gestures is not satisfactory (block 245—No), the designer returns to block 215 and adds more data to the training set, where such data is used to resolve the problems observed in the testing of the classifier on live gestures. If the performance of the classifier on live gestures is satisfactory (block 245—Yes), the designer is done, the definition of the gesture(s) and the generation of the classifier is considered complete, and the process ends at block 299. At this point, the designer can make the gesture(s) available for use in his game or application.

Figure 3:
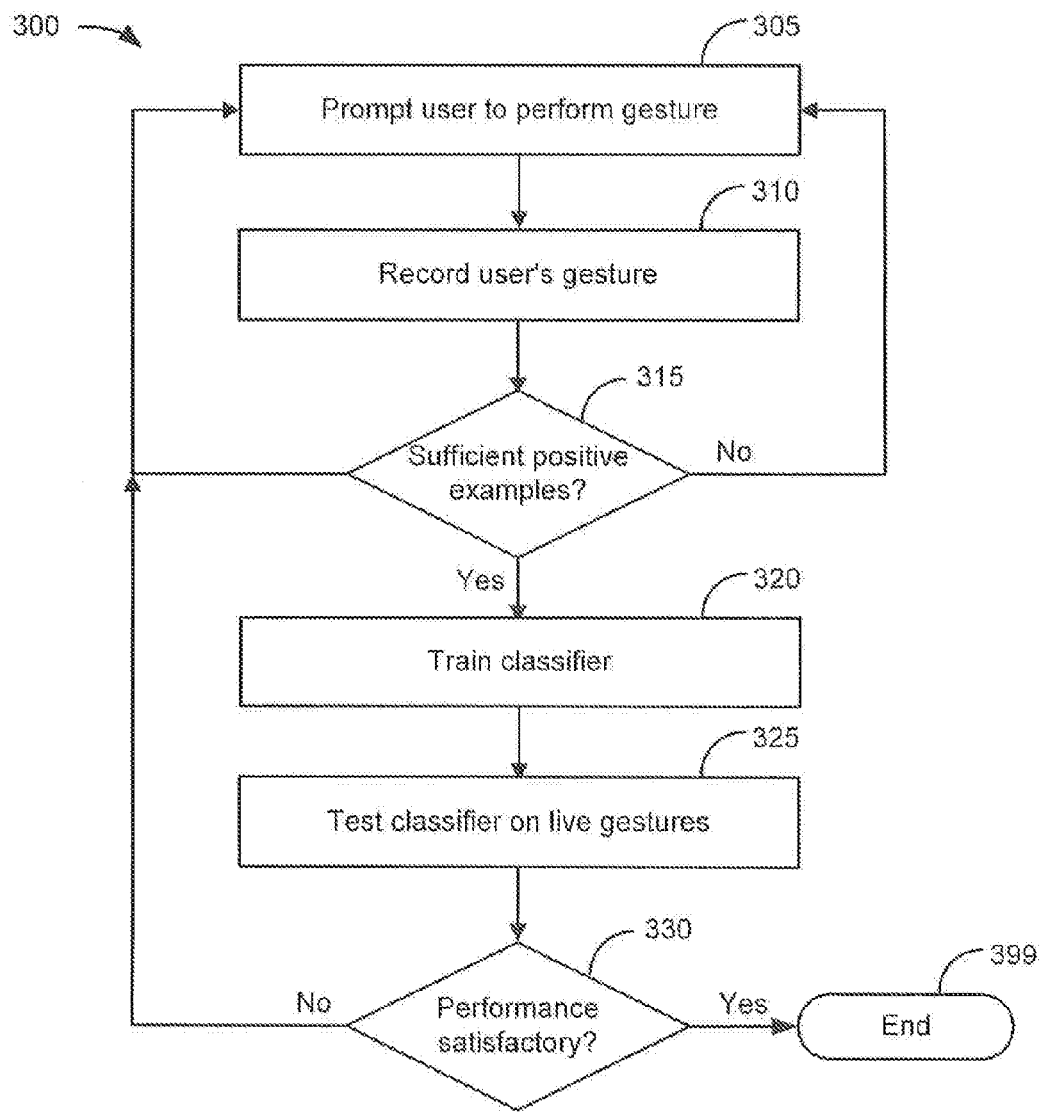
FIG. 3 is a flow diagram illustrating an example process of an end-user authoring a gesture.

FIG. 2 describes the gesture authoring and classifier generation process for a gesture designer. Such gestures can be used in a game or other application that is played by people who were not involved in the gesture creation process (e.g., the data training set did not include sequences of such people performing the gestures). FIG. 3 describes an alternative embodiment of the invention that is appropriate, for example, in the case where the user creating the gestures is the same one who will be using them. In this embodiment, the user is repeatedly prompted to perform a gesture and the system records the gesture as the subject performs it. This process obviates the need to manually mark the training sequences.

At block 305, the subject is prompted to perform a given gesture. This prompt could be, for example, by way of a graphic on a display that instructs the user when to perform the gesture or a verbal instruction. At block 310, when the user is prompted to perform the gesture, the gesture recognition system records the user performing the gesture.

The system determines at decision block 315 whether the user has performed the gesture a sufficient number of times to be able to generate a classifier that can identify the gesture. The decision is based upon the complexity of the gesture, how many frames the gesture requires (the duration of the gesture), and various inputs that the user provides. If there are an insufficient number of positive examples (block 315—No), the process returns to block 305 where the subject is prompted again to perform the gesture to generate additional positive examples. If there are enough positive examples (block 315—Yes), a classifier for the gesture is trained at block 320. This training can be done with a method similar to that described above, in block 225 (e.g., with support vector machines or some other machine learning technique).

Subsequently, at block 325, the classifier is tested on live gestures. Then at decision block 330, the system determines whether the performance of the classifier is satisfactory. If the performance of the classifier is satisfactory (block 330—Yes), the process ends at block 399, and the classifier is made available for use in the game or application. If the performance of the classifier is not satisfactory (block 330—No), the process returns to block 305, where the subject is prompted to perform the gesture again to generate additional positive examples.

The process in FIG. 3 allows end-users to define and create their own gestures and classifiers for identifying the gestures.

Figure 5:
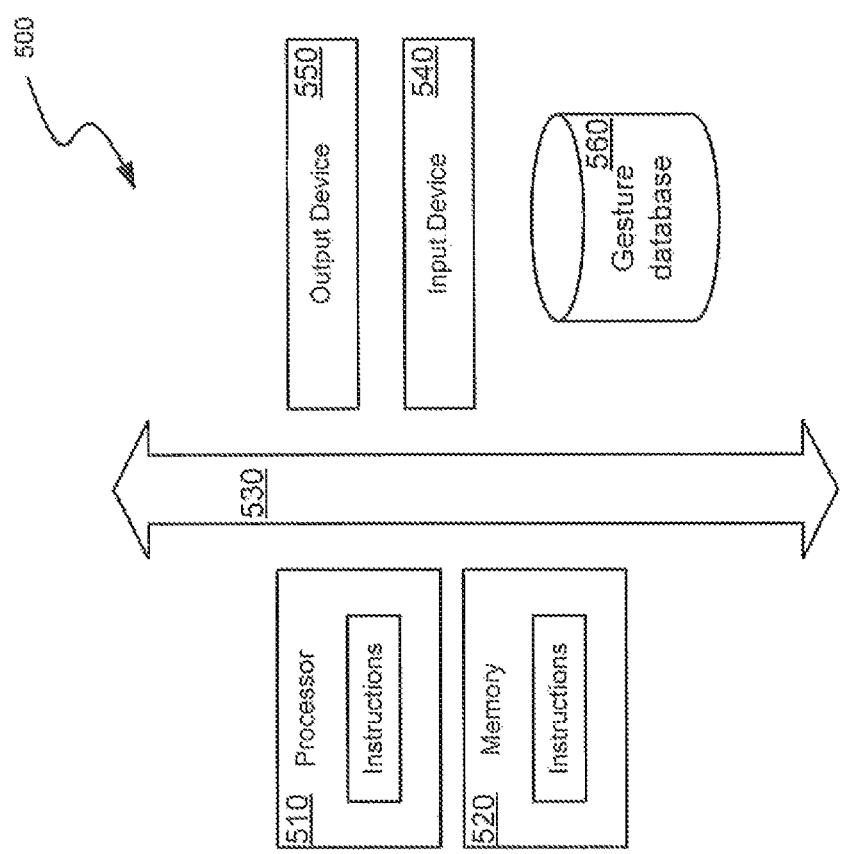
FIG. 5 shows a block diagram of example components of a system used to automatically create gestures.

FIG. 5 is a block diagram showing an example of the architecture for a system 500 that can be utilized to implement the techniques described herein. In FIG. 5, the system 500 includes one or more processors 510 and memory 520 connected via an interconnect 530. The interconnect 530 is an abstraction that represents, for example, one or more separate physical buses or point to point connections. The interconnect 530, therefore, may include, for example, a system bus, a Peripheral Component Interconnect (PCI) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

The processor(s) 510 can include central processing units (CPUs) that can execute software or firmware stored in memory 520. The processor(s) 510 may be, or may include, one or more programmable general-purpose or special-purpose microprocessors, digital signal processors (DSPs), programmable, application specific integrated circuits (ASICs), programmable logic devices (PLDs), or the like, or a combination of such devices.

The memory 520 represents any form of memory, such as random access memory (RAM), read-only memory (ROM), flash memory, or a combination of such devices. In use, the memory 520 can contain, among other things, a set of machine instructions which, when executed by processor 510, causes the processor 510 to perform operations to implement embodiments of the present disclosure.

The system 500 can also include one or more optional input devices 540 and/or optional output devices 550. Input devices 540 can include a keyboard, a mouse or other pointing device. The output device 550 can include visual displays, speakers, and communication devices that operate through wired or wireless communications.

The system 500 can further include one or more gesture databases 560 for storing test sequences, training sequences, and/or a subject performing a gesture or series of gestures.

Figure 6:
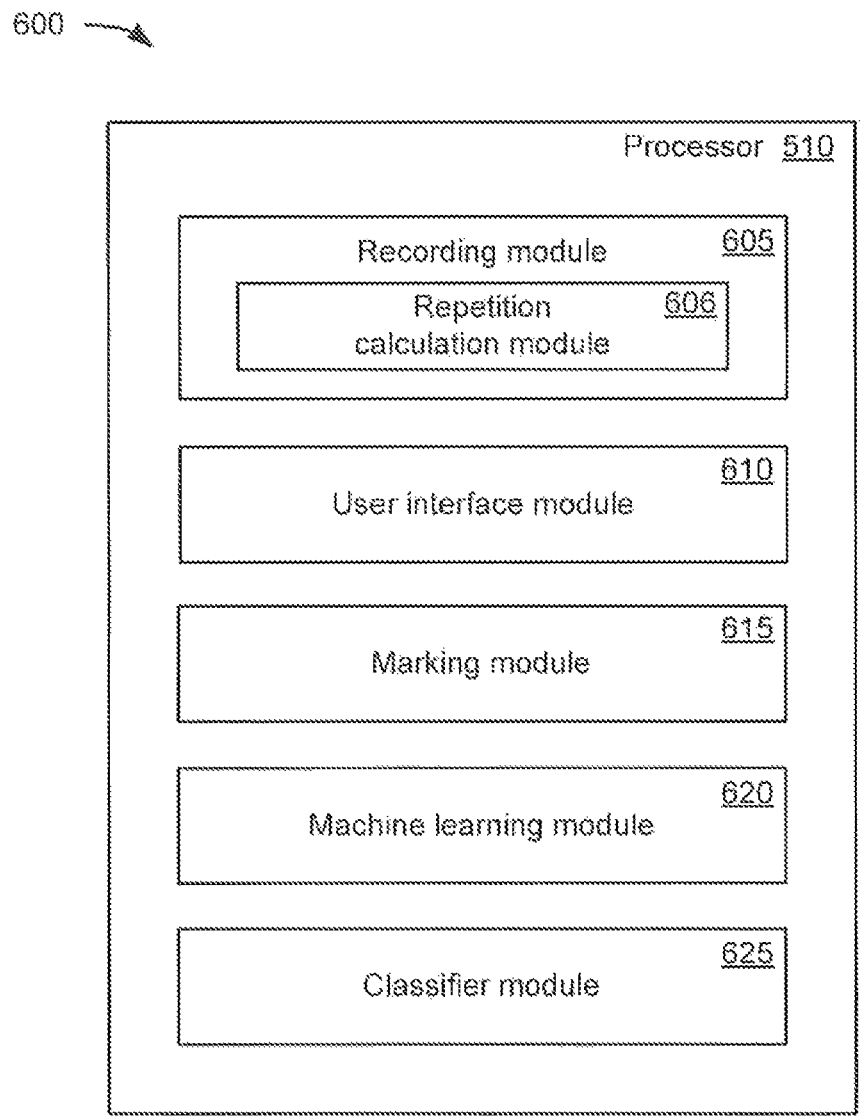
FIG. 6 shows an example block diagram of example components of a processor system used to automatically create gestures.

FIG. 6 is an example of an architecture of a portion of the processor 510 configured, for example, to allow a designer to create a gesture and generate a classifier for identifying the gesture. In the example of FIG. 6, the processor 510 (and the elements included within the processor 510) is implemented by using programmable circuitry programmed by software and/or firmware, or by using special-purpose hardwired circuitry, or by using a combination of such embodiments.

In the example of FIG. 6, the processor 510 includes a recording module 605, a user interface module 610, a marking module 615, a machine learning module 620, and a classifier module 625.

The recording module 605 records tracking data that includes sequences of people performing gestures. The tracking data includes test sequences and training sequences. The recording module 605 can take data captured by a depth sensor and store it in a database. The recording module 605 can include a repetition calculation module 606 that determines whether a user has performed a gesture a sufficient number of times for use as positive examples for generating a classifier that will recognize the gesture. The repetition calculation module 606 can base the determination upon the complexity of the gesture, how many frames are used to record the gesture, and other input provided by the user or designer.

The user interface module 610 generates a user interface that provides a way for a user to mark training sequences of recorded gestures as positive and/or negative examples. An example of a screenshot from a user interface is shown in FIG. 4.

The marking module 615 is configured to receive input from a user designating when the user is beginning and/or ending performance of a gesture. The marking module 615 can also be configured to prompt the user to perform a gesture using an output device, such as a display or speakers.

The machine learning module 620 is configured to apply one or more types of machine learning algorithms to input data to generate a classifier. Non-limiting examples of machine learning algorithms that can be used by the machine learning module 620 includes support vector machines, hidden Markov models and/or neural networks.

The classifier module 625 includes the classifiers generated by the machine learning module 620. One type of generated classifier can be defined to decide whether a particular gesture was performed or not. Another type of generated classifier can be defined to decide whether one of several different gestures was performed or none of the gestures was performed.

The techniques introduced above can be implemented by programmable circuitry, e.g., general-purpose microprocessor, programmable microcontroller, etc., programmed or configured by software and/or firmware, or entirely by special-purpose ("hardwired") circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

We claim:

1. A method comprising:
   recording test sequences of one or more users performing examples of sequences;
   recording a training set of gestures;
   marking the training set of gestures by:
      marking examples of a correct performance of the gesture as positive examples; and
      marking examples of an incorrect performance of the gesture as negative examples; and
   applying a machine learning algorithm to the marked training set to generate a classifier to determine if movements not included in the training set of gestures is similar to a positive example;
   testing the classifier on the test sequences to detect a predetermined number of false positives and false negatives, wherein the test sequences are distinct from the training set of gestures.

2. The method of claim 1, wherein applying the machine learning algorithm to the marked training further comprises:
   generating a second classifier; and
   selecting a best classifier from among the first and second classifiers.

3. The method of claim 1, wherein the machine learning algorithm is applied to different subsets of features points of a subject performing the gestures recorded for the training set and different features sets in the marked training set to generate a plurality of potential gesture recognition models, and further wherein a best performing one of the plurality of potential gesture recognition models is selected as the gesture recognition model, wherein features sets include raw image data, object segmentation data, and subsets of tracking data of user feature points.

4. The method of claim 1, wherein marking the training set comprises using voice recognition to analyze statements provided by a subject performing the gesture to indicate when the gesture begins.

5. The method of claim 1, wherein marking the training set comprises using a remote control by a subject performing the gesture to indicate a start time of the gesture.

6. The method of claim 1, wherein marking the training set comprises prompting a subject to perform the gesture at a specific time.

7. The method of claim 1, further comprising:
   testing the gesture recognition model;
   upon determining that performance of the model is unsatisfactory, recording an additional training set of gestures, and applying the machine learning algorithm to the additional training set to generate an improved gesture recognition model.

8. The method of claim 1, wherein the machine learning algorithm is applied to raw image data, object segmentation data or tracking data corresponding to at least a subset of feature paints of a subject performing the gestures recorded in the training set.

9. The method of claim 1, wherein the machine learning algorithm includes support vector machines, hidden Markov models, and/or neural networks.

10. The method of claim 1, wherein gestures recorded in the training set are performed by more than one subject.

11. A method comprising:
   recording test sequences of one or more users performing examples of sequences;
   prompting a user via a graphical user interface (GUI) to perform a training gesture;
   recording a plurality of performances of the training gesture by the user;

applying a machine learning algorithm to the plurality of performances to train a classifier for the gesture recognition model; and testing the classifier on the test sequences to detect a predetermined number of false positives and false negatives, wherein the test sequences are distinct from the training set of gestures.

12. The method of claim 11, further comprising:
determining whether a number of the recorded plurality of performances is sufficient;
upon determining that the number is insufficient, requesting the user to perform additional performances of the gesture for recording.

13. The method of claim 11, further comprising:
upon determining that performance of the model is unsatisfactory, requesting the user to perform additional performances of the gesture for recording, and applying the machine learning algorithm to the additional performances to generate an improved gesture recognition model.

14. The method of claim 11, wherein the machine learning algorithm is support vector machines, hidden Markov models and/or neural networks.

15. The method of claim 11, wherein the machine learning algorithm is applied to raw image data, object segmentation data, or tracking data corresponding to at least a subset of the user's feature points in the plurality of performances.

16. An apparatus for generating a gesture recognition model for determining if a gesture has been performed by one of a plurality of users, the apparatus comprising:
a recording module to record sequences of one or more users performing examples of sequences and a training set of gestures;
a gesture information module to receive information associated with the gestures recorded in the training set from a designer;
a marking module to mark the training set of gestures by marking examples of a correct performance of the gesture as positive examples and marking examples of an incorrect performance of the gesture as negative examples
a machine learning module to apply a machine learning algorithm to generate a classifier to determine if movements not included in the training set of gestures is similar to a positive example; and
a testing module to test the classifier on the test sequences to detect a predetermined number of false positives and false negatives, wherein the test sequences are distinct from the training set of gestures.

17. The apparatus of claim 16, wherein machine learning module generates a second classifier and selects a best classifier from amongst the first and second classifiers.

18. The apparatus of claim 16, wherein the machine learning algorithm is applied to different subsets of the user's features points and different features sets in the marked training set of gestures to generate a plurality of potential gesture recognition models, and further wherein a best performing one of the plurality of potential gesture recognition models is selected as the gesture recognition model, wherein features sets include raw image data, object segmentation data, and subsets of tracking data of user feature points.

19. The apparatus of claim 16, wherein information associated with the gestures comprises voice recognition of statements provided by a subject performing the gesture to indicate when the gesture begins.

20. The apparatus of claim 16, wherein information associated with the gestures comprises output from a remote control provided by a subject performing the gesture to indicate a start time of the gesture.

21. The apparatus of claim 16, wherein information associated with the gestures comprises timing information used for prompting a subject to perform the gesture at a specific time.

22. An apparatus for generating a gesture recognition model for determining if a gesture has been performed by a user, the apparatus comprising: a recording module configured to record test sequences of one or more users performing examples of sequences;
a graphical user interface (GUI) to prompt a user to perform a training gesture;
a recording module configured to record sequences of one or more users performing examples of sequences and a plurality of performances of the training gesture by the user;
a machine learning module configured to apply a machine learning algorithm to the plurality of performances to train a classifier for the gesture recognition model; and
a testing module to test the classifier on the test sequences to detect a predetermined number of false positives and false negatives, wherein the test sequences are distinct from the training set of gestures.

23. The apparatus of claim 22, wherein the machine learning algorithm is applied to raw image data, object segmentation data, or tracking data corresponding to at least a subset of the user's feature points of the plurality of performances.

24. The apparatus of claim 22, wherein the testing module determines whether a performance of the gesture recognition model is satisfactory.

25. A non-transitory computer readable medium having instructions, which when executed by a processor, cause the processor to form operations comprising:
recording test sequences of one or more users performing examples of sequences;
recording a training set of gestures;
marking the training set of gestures by:
    marking examples of a correct performance of the gesture as positive examples; and
    marking examples of an incorrect performance of the gesture as negative examples; and
applying a machine learning algorithm to the marked training set to generate a classifier to determine if movements not included in the training set of gestures is similar to a positive example;
testing the classifier on the test sequences to detect a predetermined number of false positives and false negatives, wherein the test sequences are distinct from the training set of gestures.

26. The computer readable medium of claim 25, wherein applying the machine learning algorithm to the marked training further comprises:
generating a second classifier; and
selecting a best classifier from among the first and second classifiers.

27. The computer readable medium of claim 25, wherein the machine learning algorithm is applied to different subsets of features points of a subject performing the gestures recorded for the training set and different features sets in the marked training set to generate a plurality of potential gesture recognition models, and further wherein a best performing one of the plurality of potential gesture recognition models is selected as the gesture recognition model, wherein features sets include raw image data, object segmentation data, and subsets of tracking data of user feature points.

28. A non-transitory computer readable medium having instructions, which when executed by a processor, cause the processor to form operations comprising:
- recording test sequences of one or more users performing examples of sequences;
- prompting a user via a graphical user interface (GUI) to perform a training gesture;
- recording a plurality of performances of the training gesture by the user;
- applying a machine learning algorithm to the plurality of performances to train a classifier for the gesture recognition model; and
- testing the classifier on the test sequences to detect a predetermined number of false positives and false negatives, wherein the test sequences are distinct from the training set of gestures.

29. The computer readable medium having instructions of claim 28, which when executed by a processor, further cause the processor to form operations comprising:
- determining whether a number of the recorded plurality of performances is sufficient;
- upon determining that the number is insufficient, requesting the user to perform additional performances of the gesture for recording.

30. The computer readable medium having instructions of claim 28, which when executed by a processor, further cause the processor to form operations comprising:
- upon determining that performance of the model is unsatisfactory, requesting the user to perform additional performances of the gesture for recording, and applying the machine learning algorithm to the additional performances to generate an improved gesture recognition model.

* * * * *